July 3, 1951 P. A. FRANK 2,559,119
TIRE CURING APPARATUS AND METHOD
Filed Jan. 25, 1950 6 Sheets—Sheet 1

INVENTOR.
PAUL A. FRANK
BY
Oberlin & Limbach
ATTORNEYS.

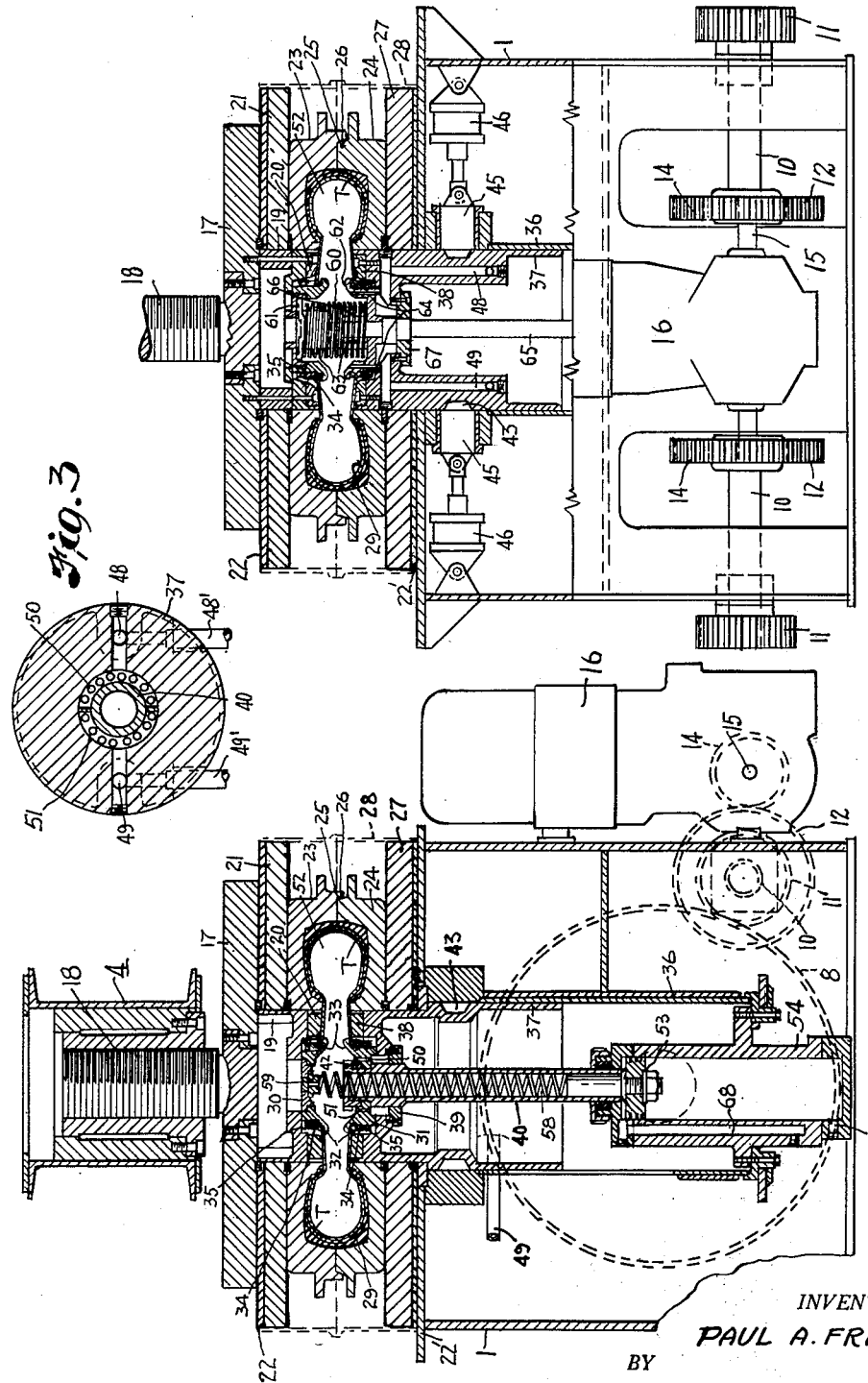

July 3, 1951 P. A. FRANK 2,559,119
TIRE CURING APPARATUS AND METHOD
Filed Jan. 25, 1950 6 Sheets-Sheet 3

INVENTOR.
PAUL A. FRANK
BY
Oberlin & Limbach
ATTORNEYS

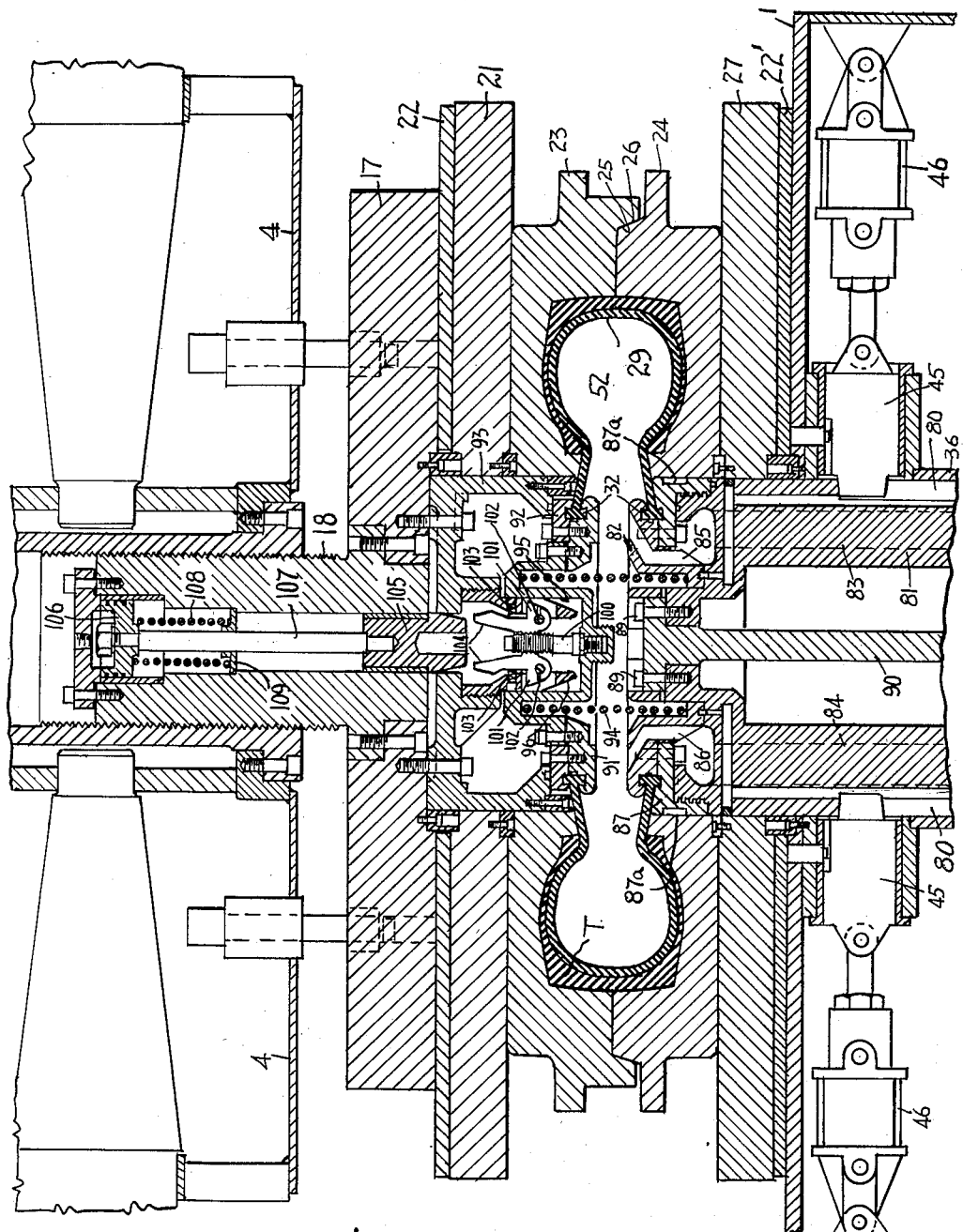

July 3, 1951 P. A. FRANK 2,559,119
TIRE CURING APPARATUS AND METHOD
Filed Jan. 25, 1950 6 Sheets-Sheet 5

INVENTOR.
PAUL A. FRANK
BY
Oberlin & Limbach
ATTORNEYS.

July 3, 1951  P. A. FRANK  2,559,119
TIRE CURING APPARATUS AND METHOD
Filed Jan. 25, 1950  6 Sheets-Sheet 6
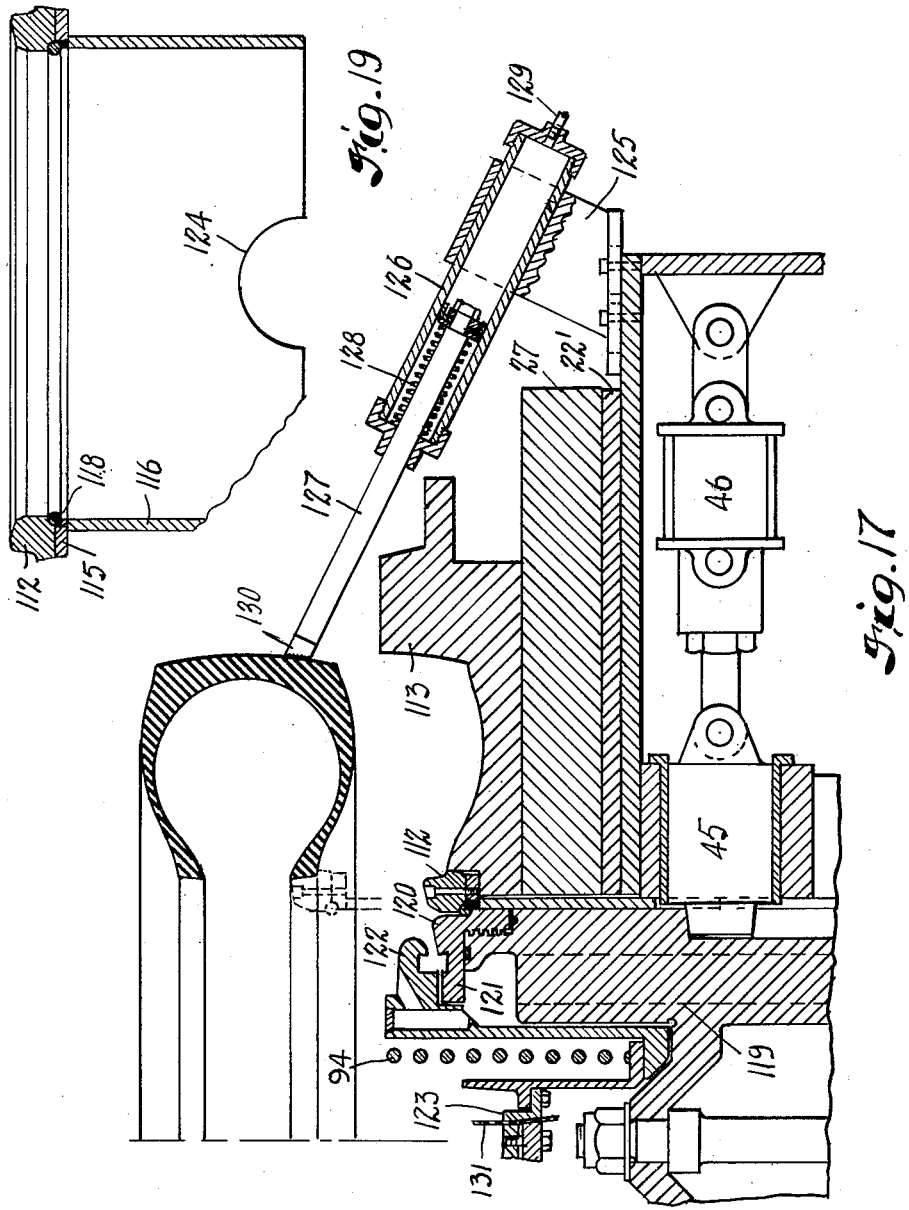
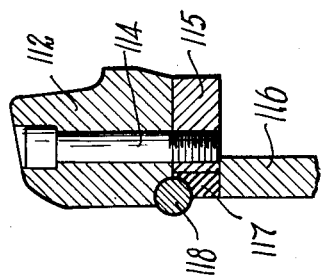
INVENTOR.
PAUL A. FRANK
BY
Oberlin & Limbach
ATTORNEYS Patented July 3, 1951

2,559,119

UNITED STATES PATENT OFFICE 2,559,119

TIRE CURING APPARATUS AND METHOD

Paul A. Frank, Akron, Ohio

Application January 25, 1950, Serial No. 140,479

20 Claims. (Cl. 18—17)

The present invention relates generally as indicated to a pneumatic tire vulcanizing apparatus and method, and more particularly to a method of and apparatus for vulcanizing or curing a tire carcass which is initially built as a flat band on a collapsible drum. The apparatus of my invention receives the green carcass of the tire in its original flat band form, first shapes it to the desired ultimate contour by moving the beads thereof toward each other, provides a liner or casing to seal the inside of the carcass from the curing medium such as steam or hot water, and then finally cures or vulcanizes the tire into its desired finished form.

For some years past it has been the practice in manufacturing the major portion of pneumatic tires to construct the green carcass as a flat band on a collapsible drum with the reinforced bead structure of the tire at opposite ends of the band. The band is then removed from the drum by collapsing the latter. Various machines are now in use for transforming the green flat band carcass into substantially the shape of the finished tire by forcing the beads toward each other and the intermediate or tread portion of the carcass radially outward into the proper shape to receive the curing bag which is then inserted mechanically. The curing operation is then performed by encasing the bagged green carcass in suitably heated molds and maintaining the bag under internal pressure as by steam or hot water.

There have been attempts in the prior art to provide single machines which would sequentially perform the two steps last enumerated, namely that of shaping the flat band of the tire and then vulcanizing or curing it. None of these machines have been generally accepted by the industry for various reasons.

A representative example of an early machine capable of sequentially forming and vulcanizing a flat band tire is shown in De Mattia Patent No. 1,389,442. That patent marked an important milestone in this development in that it did away with the conventional curing bag and substituted therefor a substantially cylindrical structure having rigid ends and a flexible side wall which, when placed in telescopic engagement with the tire in the mold and inflated as the molds closed, was effective to deform the tire into the desired shape and maintain the interior of the tire under pressure during the vulcanizing operation. The patent, while thus providing a substitute for the well known curing bag, and which substitute was capable of forming the tire immediately prior to the vulcanizing step, was nevertheless deficient and never used commercially because there was no provision for the rapid and easy manipulation of the parts necessary if the apparatus is to be used commercially where considerations of cost of operation are paramount.

The next effort in point of time toward the solution of this problem is represented by Patent No. 1,942,797 issued to C. E. Bittaker on January 9, 1934, wherein the mating mold sections within which the tire was cured and which were divided on a substantially equatorial plane, were first brought into engagement with the beads at opposite ends of the green flat band of the tire. The mold sections were then brought into mating engagement with an annular sealing member bridging the space between the bead rings of the carcass. There was no control provided in the Bittaker patent for insuring the manner in which the main body of the green carcass behaved during the period when the beads were brought together coincidental with the closing of the press since the carcass was not inflated until after the press was closed. This proved an impractical solution because of the aforesaid lack of control over the behavior of the central portion of the tire carcass during the step of forming it from the flat band to substantially the form of the finished tire.

The next attempt at the solution of this problem is represented by Patent No. 2,243,532 issued to C. E. Maynard on May 27, 1941, which was, however, little more than the placing of the De Mattia device comprising the compartment heads aforesaid and the cylindrical flexible diaphragm laterally surrounding the spaced compartment heads, onto a supporting stem which was capable not only of holding the head and diaphragm assembly in proper relation with respect to the molds, but which also was capable of supporting such head and diaphragm assembly in space intermediately of the molds as the press was opened. The flat green band was placed around the diaphragm in precisely the same type of loading operation as was originally contemplated by De Mattia. While the Maynard improvement thus provided the necessary supporting and manipulating means for the De Mattia structure, the Maynard device still left much to be desired in that it was difficult to load the press since this required the careful placing of the flat band green carcass about the deforming assembly while it was held in spaced relation between the open mold halves. A limited amount of room made this operation exceedingly difficult, and since the forming means of the Maynard press were always positioned between the mold halves when the latter were in their opened position, at the end of the curing cycle, it was quite inconvenient to remove the cured tire from the press. In addition to the foregoing shortcomings, the Maynard machine also did not seat the uncured tire on the mating mold sections in such a way as to always preclude the placing of undesirable stresses on portions of the uncured carcass during the step of deforming it to substantially finished tire shape.

The next prior art worker who addressed himself to this problem was L. E. Soderquist, to whom Patent No. 2,296,800 issued on September 22, 1942. Soderquist's press, as illustrated in the last-mentioned patent, is essentially the same as that shown in the Maynard patent just described in that the deforming means for the green flat band comprises spaced heads laterally encompassed by a deformable cylindrical diaphragm with a piston rod attached to one of the heads and extending through the other head. Power means, such as an air cylinder, coupled to the piston rod was employed to move said heads toward and away from each other. The contribution by Soderquist in his Patent No. 2,296,800 over Maynard was the provision of a hook which moved into the space between the mold sections immediately the latter separated at the end of the curing cycle to accomplish mechanically two functions. First, the hook assisted in pulling the cured tire out of the lower mold, and then as the upper mold section on which the hook was mounted was elevated and the deforming means centrally of the tire radially constricted by a separation of the heads thereof, the hook carried the tire upwardly over and off from the deforming means which in this Soderquist patent, as in the Maynard patent, always extended into the space between the mold sections when the press was open. Soderquist thus realized and provided a solution for one of the principal deficiencies of Maynard, namely the matter of removing the cured tire from the press. This Soderquist accomplished mechanically by the hook just described. Soderquist left unsolved, however, the difficulty inherent in both Maynard and Soderquist of loading the press, which in each case required the elevation of the green carcass manually to a point where it could be dropped down over the deforming device and then accurately positioned thereon before the press was closed.

Soderquist in a second Patent No. 2,337,857 sought to provide a solution of this second deficiency of the Maynard press, i. e. that of loading the press with the green flat band carcass, and in a measure also solved the other problem of getting the cured tire out of the press by considerably reducing the vertical height of the deforming means. In his Patent No. 2,337,857 Soderquist made the opposite heads about which the deforming diaphragm is secured fixed with respect to each other, with an annular cavity therebetween into which the diaphragm was to be sucked, and out of which the diaphragm was to be forced by air pressure during the forming and curing operation. This proposal was not successful because it only partially solved the loading and unloading problems in that the deforming means still extended for a substantial distance into the space between the mold sections at all times while they were open, and, secondly, the extreme amount of flexing to which the diaphragm was subjected resulted in such a short life for such diaphragms that that construction was never adopted commercially.

In the method and apparatus of my present invention I provide a solution to the foregoing problems which have been the principal objections to the wide spread use of the prior art proposals above described. In a press constructed in accordance with my invention the deforming means is moved entirely out of the space between the mold halves when the press is open, thus solving completely the loading and unloading problems aforesaid inherent in all of the prior art structures, and such deforming means and the means provided for the manipulation of the same insures a control over the green carcass during the deforming operation not possible with any of the prior art structures.

Acordingly, it is a principal object of my invention to provide a method of and apparatus for vulcanizing tires having all of the above-named advantages over the prior art.

Other objects and advantages will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative however, of but a few of the various ways in which the principle of the invention may be employed.

In said annexed drawings:

Fig. 2 is a cross-section view taken substantially along the line 2—2, Fig. 1;

Fig. 3 is a transverse cross-section view taken substantially along the line 3—3, Fig. 1;

Fig. 4 is a cross-section view similar to Fig. 1 except illustrating a modification;

Fig. 5 is a cross-section view also similar to Fig. 1 but illustrating still another embodiment of the invention;

Figure 1:
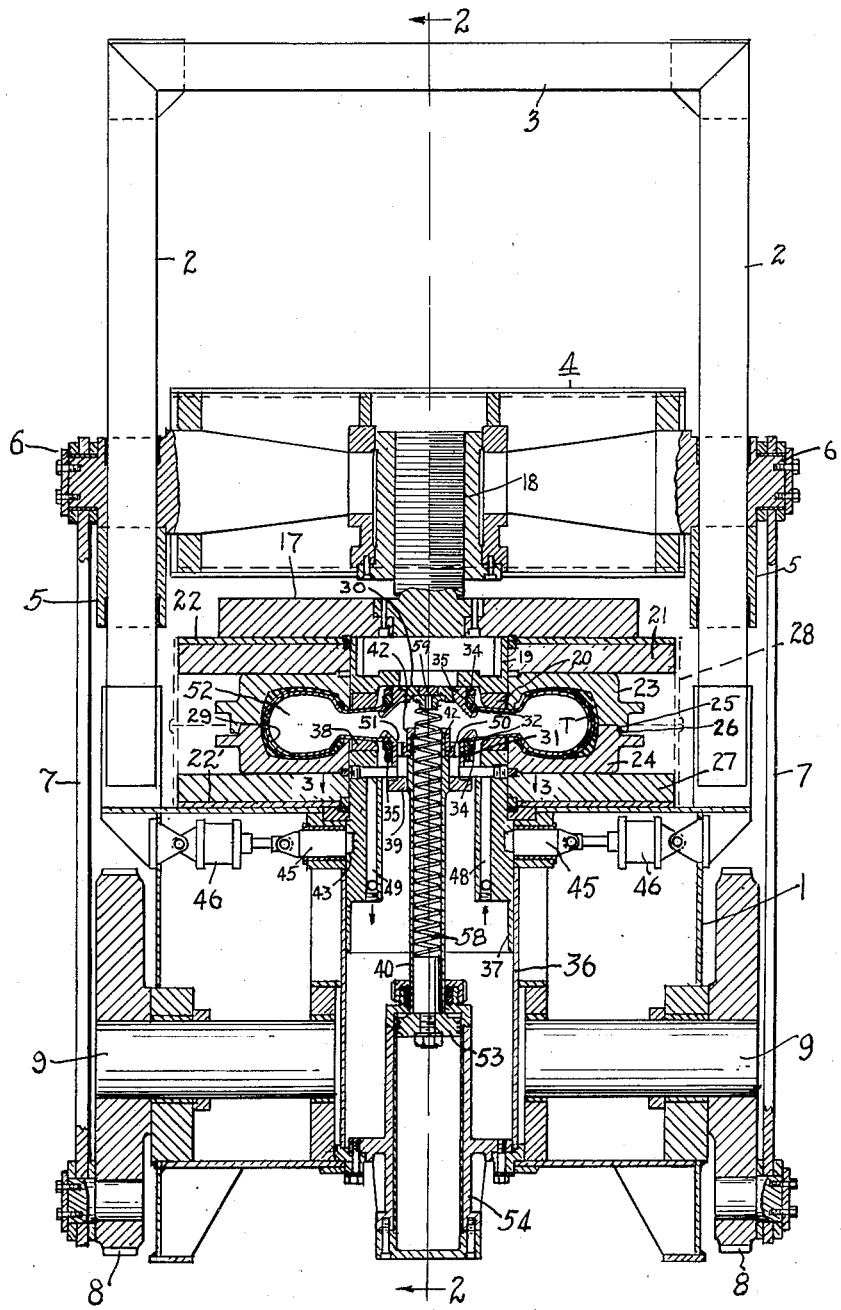
Fig. 1 is a vertical cross-section view of one embodiment of this invention, the plane of the section having been passed through the axis of the mold sections and the expansible diaphragm.

Figs. 6 to 16 inclusive, illustrate, somewhat diagrammatically, the relative positions of the mold sections and diaphragm unit of one form of apparatus during the successive steps of curing or vulcanizing a tire;

Fig. 17 is a fragmentary sectional view of a press construction like the form shown in Fig. 5 but showing auxiliary mechanism for supporting the cured tire above and out of contact with the lower mold section;

Fig. 18 is a fragmentary sectional view drawn to an enlarged scale of the bead ring portion of the mold illustrated in Fig. 17; and Fig. 19 is a fragmentary sectional view of such bead ring and its associated guide and supporting sleeve.

In the drawings, several different forms or embodiments of the invention have been illustrated.

Figures 1, 2 and 3 show one form of the invention characterized by the employment of a relatively long spring for the purpose of urging apart the heads between which is supported the deforming and curing diaphragm.

Figure 4 shows a different form of construction characterized by a much shorter spring for forcing apart the diaphragm supporting heads.

Figure 5 shows yet another form of construction which while utilizing the same shorter form of spring is further characterized by provision of means associated with the upper press head for removable engagement with the upper diaphragm supporting head to assist the spring in raising such upper head during opening movement of the press and to insure that such beads will be held apart during one period in the cycle of operations of the press when the space within the diaphragm is under vacuum.

Figures 6 to 16 are sketches showing the different positions of the press parts during a complete curing cycle. These sketches are illustrative of the mode of operation of each of the several forms of the invention illustrated in all of the other figures of the drawings.

Figure 17 is the illustration of yet another form of construction characterized by the provision of means for engaging and holding the cured tire at an elevated position above the hot lower mold section to prevent the tire from being blemished if the operator should neglect to remove it from the press within a reasonable time after the completion of the cure and the opening of the press.

Referring now specifically to that form of the invention illustrated in Figures 1 and 2 of the drawing, the illustrated apparatus comprises a base 1 from which extend upwardly a pair of parallel vertical guides in the form of columns 2 secured together at their upper ends as by means of the cross member 3. An upper head 4 has its opposite ends 5 slidably fitted on said columns 2 and provided with trunnions 6 to which are pivotally connected the upper ends of a pair of arms 7. The lower ends of said arms 7 are pivotally connected to gear cranks 8 which are keyed onto shafts 9 journalled in said base 1. Disposed parallel to the shafts 9 is a shaft 10 rotatable in said base and having fixed thereon a pair of gears 11 in mesh with the gear cranks 8 and an intermediate pair of gears 12 meshing with gears 14 secured at the opposite ends of the drive shaft 15 of a drive gear head motor 16 which is mounted on one side of said base 1 as shown.

A top platen 17 is vertically adjustably connected to the upper head 4 as by means of a threaded connection 18 between said platen 17 and said head 4. Secured underneath said platen 17 as by suitable bolts (not shown) is an annular member 19 carrying a seat ring 20, said member and seat ring adapted to have engagement with the upper head of the radially expansible diaphragm unit to be described later.

Said platen 17 also carries a plate 21 thereunder with a piece of asbestos or like insulating board 22 between said platen and plate and attached to the bottom of said plate is the top mold section 23 of a pair of complementary top and bottom mold sections, the bottom section of which is identified by the numeral 24. Said mold sections 23 and 24 are formed with an interfitting chamfered mating surfaces 25 and 26 respectively effecting accurate alignment of the mold sections so as to define accurately a mold cavity conforming with the desired final shape of the tire. The bottom mold section 24 is carried on a plate 27 which is similar to the plate 21 and another insulating board 22' is interposed between said plate 27 and the base 1 of the machine. Said plate 27 is bolted or otherwise secured to the base 1 of the machine and in turn the mold section 24 is bolted or otherwise secured to said plate.

In order to further minimize the heat loss from the press a heat shield 28 may be positioned so as to encircle the mold sections 23 and 24 in addition to the provision of the insulation boards 22 and 22' which restrict flow of heat away from the molds.

From the foregoing description it is evident that the rotation of the gear cranks 8 will effect movement of the mold sections 23 and 24 toward and away from each other between the closed and open positions, the molds being in closed position in Figures 1 and 2.

Centrally of the ring-like mold section 24 and coaxially therewith is a radially expansible unit which comprises a flexible radially expansible diaphragm 29 of rubber or rubber-like material and preferably of a normal generally cylindrical shape. Said diaphragm is closed at opposite ends by upper and lower heads 30 and 31 respectively. Said heads 30 and 31 and said diaphragm 29 are connected together as by means of the beads 32 formed at opposite ends of said diaphragm clamped in recesses defined between the flange portion 33 of each head and a ring 34 on each head as by means of a nut 35 threaded onto each head and bearing against the respective ring 34.

Within said base 1 is an upright cylinder 36 defining a well and within which and within the mold section 24 and plate 27, a piston-like member 37 is vertically reciprocable. Bolted to the upper end of said member 37 is a seat ring 38 similar to the seat ring 20 to provide a seat for the bottom end of the diaphragm 29 when the latter is inflated as shown in Figs. 1 and 2. The member 37 is fixedly clamped between the lower head 31 and a flange 39 secured on piston rod 40 as by means of bolts, said piston rod 40 in turn being fixedly connected to said lower head 31 as by means of the nut 42 threaded onto the upper end of said piston rod 40 for clamping the head 31 against a shoulder on said piston rod.

Said member 37 is formed with notches or a peripheral groove 43 into and from which the locking plungers 45 are adapted to be engaged and disengaged as by the double acting pneumatic rams 46 which are operatively interposed between said plungers 45 and abutment portion of base 1. The member 37 is further formed with inlet and outlet passages 48 and 49 for flow of a fluid curing medium such as hot water or steam for example, said lower head 31 being provided with two series of openings 50 and 51 therethrough affording communication of the passages 48 and 49 with the chamber 52 defined within said expansible unit whereby curing medium under pressure is adapted to be circulated through such chamber.

The passages 48 and 49 and their associate passages 50 and 51, respectively, may be of substantial size as compared with the passage normally provided through the valve stems of curing bags so that it is possible to more quickly bring the chamber 52 up to the desired pressure and also more quickly to reduce the pressure within such chamber to substantial atmospheric pressure as for example at the end of the cure. Moreover, since one of the last steps in the curing cycle is to quickly flood the inside of the tire with a cooling medium such as cold water for the purpose of arresting the cure at precisely the proper time, it is possible by the use of my apparatus to accomplish this much more rapidly than in the prior art types of construction, for example using a conventional curing bag with conventional valve stems which necessarily have restricted passages.

Fluid is led to passage 48 and from passage 49 by suitable flexible conduits 48' and 49' (see Fig. 3) connected to the lower ends of such passages and extending laterally through slots (not shown) in the skirt 37 and the guiding sleeve 36.

A piston 53 is connected to the lower end of said piston rod 40 and is reciprocable in a cylinder 54 which is fastened to the lower portion of the base 1 in a position coaxial with cylinder 36 and mold sections 23 and 24.

In the embodiment of the invention illustrated in Figures 1–3 the upper and lower heads 30 and 31 are constantly urged apart as by the coil spring 58 or its equivalent, said spring extending downwardly into the piston rod 40 and having its upper end fitted around a spring guide 59 which is centered within the upper head 30.

The modification illustrated in Figure 4 is different from the construction illustrated in Figures 1 to 3 only with respect to the spring means and the mounting therefor by which the heads secured to the opposite ends of the diaphragm are urged apart. In order therefore to avoid the necessity of again describing parts of the press illustrated in Fig. 4 which are the same as corresponding parts of the press illustrated in Figures 1 to 3 like reference characters will be employed to designate such like parts.

In the construction illustrated in Figure 4, a coil spring 60 having the same function as the spring 58 of the construction illustrated in Figures 1 and 2, is compressed between an upper head 61 and a lower head 62 secured to diaphragm 29 similarly to heads 30 and 31 of the construction shown in Figures 1 to 3, and is centered as by means of guides 63 which project axially from said heads 61 and 62 respectively. The lower head 62 is formed with apertures 64 therethrough to establish communication between the passages in member 37 and the chamber 52 formed within the expansible unit. In this case a piston rod 65 has a collar 67 welded or otherwise secured thereonto for connecting as by bolts, as shown, the member 37 to the piston rod 65 and a nut 66 threaded onto said piston rod clamps the lower head 62 against a shoulder on the piston rod. Of course, the piston rod 65 will have a piston 53 similar to that illustrated in Figures 1 and 2 reciprocable with a cylinder 54.

In general, the apparatus illustrated in Figure 5 is somewhat the same as the two previously described and therefore the ensuing description is restricted to the essential features of distinction, like reference characters being employed again to designate parts which are the same as those forming a part of the constructions shown in the previous figures.

One such distinguishing feature is the formation of notches or a peripheral groove 80 in the piston-like member 81 in which the locking plungers 45 are adapted to be engaged during certain steps in the operation of the apparatus, such notches or groove, as the case may be, being in this instance of sufficient axial extent to permit a desired elevation of the diaphragm 29 from the lowermost engaged position illustrated in Fig. 5. The reason for providing additional elevational movement of said diaphragm, for example on the order of 3" in certain sizes of presses, will appear from the description of operation of the presses which will be given presently.

As in the other forms of the invention, a lower head 82 is bolted or otherwise secured to the upper end of member 81, said member and head being formed with passages 84—84, and 85—86, respectively, for circulation of curing medium through the chamber 52 defined within said diaphragm 29. Also secured to the member 81 is a seat member 87 having a sliding fit within cylinder 36 and in the lower mold section 24 and adapted to be positioned as shown in Fig. 5 with its upper face flush with the adjacent upper face of the mold section 24 to provide a smooth, uninterrupted supporting surface for the diaphragm and thereby avoid sharp edges and crevices into which the diaphragm 29 might be extruded by pressure of the curing and expanding medium. Such construction also permits use of a relatively thin wall diaphragm for securing more rapid heat transfer therethrough. The lower bead 32 of said diaphragm is clamped between complementary recesses in said lower head 82 and said seat ring 87. Also connected to said member 81 as by bolts 89 is a piston rod 90 comparable with the piston rods 40 and 65 in Figures 1 and 4 and again connected to a piston 53 or the like for effecting desired vertical reciprocation of the diaphragm 29.

The upper head 91 closes the upper end of diaphragm 29, the upper bead 32 of said diaphragm being clamped between recesses in said head and in a seat ring 92 which are complementary with said bead. In the position of the parts shown in Fig. 5, said seat ring 92 fits within the inverted cup-shaped member 93 whereby the bottom annular and adjacent surfaces of said ring 92, said member 93, and top mold section 23 define a smooth and substantially continuous supporting surface to prevent extrusion or excessive distortion of said diaphragm by pressure of curing or other medium circulated in chamber 52. Said member 93 is secured as by bolts to upper platen 17 in a position centrally of the cavity in mold section 23.

Interposed between said heads 82 and 91 is a compression spring 94 tending to urge the heads apart to a position with the diaphragm therebetween in unexpanded generally cylindrical form.

Another distinguishing feature of the Figure 5 apparatus is the provision of means insuring alignment of the diaphragm 29 and tire therearound coaxially of the mold sections 23 and 24. One manner of accomplishing this aligning feature is to provide an upwardly opening recess 95 in head 91 and a downwardly extending coniform projection 96 which is screw threaded centrally in member 93. The lower end portion of said projection 96 is of frusto-conical or tapered form to facilitate entrance into recess 95 and the adjacent portion is cylindrical or other shape so as to have a fairly close telescopic fit in said recess thereby properly and accurately positioning the upper head 91 of the diaphragm 29. As apparent the projection and recess may be reversed if desired whereby a projection of the upper head telescopically fits within a recess in member 93. As another alternative, the upper head 90 and the upper platen 17 or parts secured to either or both may be provided with an interfitting conical recess 97 and conical projection 98 as shown in Figs. 6–16, such interfitting conical surfaces as obvious effecting proper and accurate alignment of a diaphragm 29 with respect to the top mold section 23.

Still another distinguishing feature of the Figure 5 apparatus is the provision of a mechanism for positively raising the upper head 91 of said diaphragm in unison with upward movement of the mold section 23 during certain stages of the operation as hereinafter more particularly pointed out. One such mechanism comprises an upwardly extending stud 100 threaded into upper head 91 and having a threaded, serrated, or otherwise roughened outer surface, and one or more dogs 101 swingable on pivots 102 in projection 96 to engage and disengage the correspondingly threaded, serrated, or otherwise roughened inner faces of said dogs with the outer surface of said stud. Springs 103 interposed between said projection 96 and said dogs constantly tend to swing said dogs inward to effect engagement with the stud 100 as aforesaid.

In order to effect disengagement between said dogs 101 and said stud 100 the upper end portions of said dogs are provided with cam surfaces 104 between which frusto-conical actuator 105 is insertable to effect outward swinging of the dogs, such outward swinging freeing the dogs from said stud whereby the upper mold section 23 and upper platen 17 may be elevated independently of the upper head of said diaphragm.

The upper platen 17 has an extension 18 constituting a cylinder in which a piston 106 is reciprocable, said piston having its piston rod 107 secured to actuator 105 whereby said actuator may be projected between said dogs 101 to disengage the latter from stud 100 and retracted from between said dogs to permit springs 103 to swing said dogs inwardly into gripping engagement with stud 100. Said cylinder and piston are preferably of the single acting type in which case retractive or upward movement of the actuator 105 is effected by venting the actuating fluid in the cylinder whereupon a spring 108 compressed between piston 106 and an abutment plate 109 in extension 18 urges said piston 106, rod 107 and actuator 105 upward. Obviously, a double acting cylinder and piston assemblage could be substituted in which case spring 108 could be omitted, and also means other than a fluid power means could be substituted in order to obtain the necessary movement of the actuator 105.

By having reference to the structure illustrated in Fig. 5 it will be noted that the deforming mechanism which is carried by the reciprocating piston-like member 81 comprises upper and lower heads urged apart under the influence of the spring 94, such heads respectively securing the opposite ends of the diaphragm 29. When the press is fully open the assembly just described is normally retracted in the cylinder in which the piston 81 is vertically reciprocable. For purposes of inspection, repair and replacement, the piston 81 may be moved upwardly while the press is open, such travel being for a distance sufficient to bring the lower edge of the internally threaded ring 87 above the inner edge of the lower mold part 24. With the parts in this position the entire deforming assembly comprising the spaced heads, the diaphragm and the spring may be removed from the upper end of the piston 21 by placing a spanner wrench in openings such as 87a and in this way the entire expander assembly is unscrewed from the top of the piston 81. This is an important feature of the present construction. In plants where presses of this kind are employed they are usually operated as a battery. The part which will probably require most frequent inspection, repair and replacement is the diaphragm 29 and its associated deformer parts. By making the entire deformer assembly thus separable from the machine by simply unscrewing the ring 87 from the piston 81 it is entirely feasible to provide for each battery of presses a number of extra deformer assemblies which are at all times kept in the state of perfect repair. Then, when there is any difficulty whatsoever with the deformer assembly in any single press, the entire unit may be replaced in a very few moments so that the normal operation of the press is disrupted for only a very short time.

Having thus described several illustrative embodiments of this invention as shown in Figures 1–5, reference will now be made to the operation thereof. However, before proceeding further it should be pointed out that inasmuch as the present invention is not especially concerned with any specific control units such as switches, valves, cams, and the like for energizing and de-energizing the drive motor 16, for actuating the cylinders 46 and 54, and for controlling the flow and pressure of curing medium through the expansible unit and inasmuch as those skilled in the art can readily supply and properly connect such units even to the extent of providing common forms of timed automatic sequential controls without exercise of invention, the illustration of such control units has been deemed superfluous and therefore have for the sake of expediency been omitted herefrom.

Figure 6:
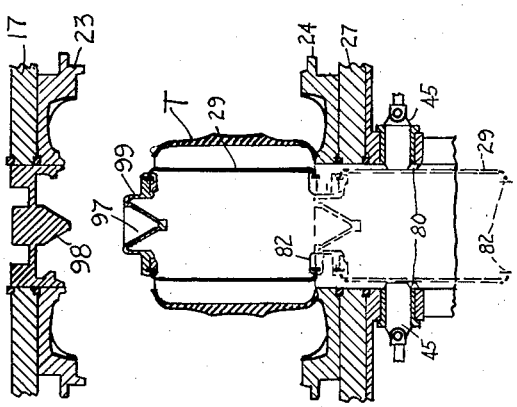
Figure 16:
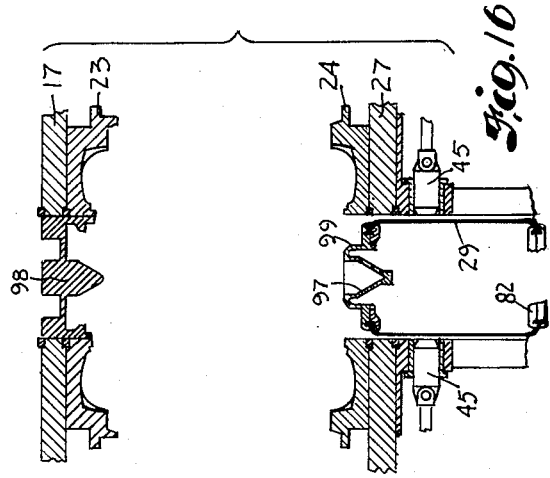

When the press is open and ready to receive an uncured flat-built tire T at the beginning of the curing cycle, the parts will have the position illustrated in Fig. 16 or that in Fig. 6 with the diaphragm 29 in the dotted line position.

The first step is to insert a tire band T in the press by placing it so that the lower bead thereof rests on the bead recess at the inner periphery of the mold cavity in lower mold section 24. The diaphragm 29 is then elevated into position inside of the uncured tire T with the mid-point of the diaphragm, that is, the mid-point between the opposite ends of the bag, elevated to a position so that such mid-point lies opposite the mid-point of the tire T, that is, midway between the beads of the uncured tire casing T. When the piston-like member 81 of Fig. 5 or 37 of Figs. 1 to 4, carrying the lower head 82 of Fig. 5 or 31 of Fig. 1 or 62 of Fig. 4 rises to such position, the locking plungers 45 move in laterally into the notches or grooves cut in the side of such piston like member. With the plungers or latches 45 in this position the piston-like members and thus the diaphragm 29 can when using the modification of Fig. 5, still travel upwardly for an additional 3" or so by reason of the axial width of such notches or groove, but with the latches in the "in" position, said piston-like member and thus diaphragm 29 cannot drop lower than a point where the mid-point of said diaphragm is opposite the mid-point of the tire T.

With the diaphram 29 thus positioned inside the tire T, said diagram is preliminarily inflated just sufficient to expand the same into engagement with the inner wall of the tire. As soon as the diaphragm has expanded into contact with the tire, said piston-like member supporting the diaphragm is then, when using the modification of Fig. 5, elevated a distance of about 3", thereby lifting the tire T from the lower mold section 24 to permit the beads of the tire band to rotate as the beads are moved toward each other as a result of the radial outward movement of the intermediate or tread portion of the tire.

After the tire T has been thus positioned in the press and while supported entirely by means of the diaphragm the upper platen 17 of the press is then caused to descend, first striking the upper head (99 in Figs. 6–16) by which the diaphragm is supported, and then carrying said head downwardly to force the beads of the tire T toward each other. At about the time when the tire has been preliminarily formed to the extent illustrated in Fig. 9, the piston-like member such as 81 and the lower head carried thereby carrying the diaphragm is then permitted to descend until the upper edges of the notches such as 80 rest against the latches 45. The latches 45 are employed as the diaphragm positioning means because they can be relied upon to positively stop the diaphragm each time in proper relation with respect to the mold sections 23 and 24. The upper mold section 23 continues its downward travel until the press is fully closed as illustrated in Fig. 11.

Figure 10:
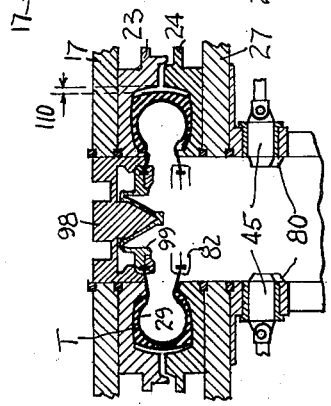

The diaphragm 29 is inflated during each of the forming operations illustrated in Figs. 8 to 11 by a substantially uniform pressure on the order of about 20 pounds per square inch. That figure is not particularly critical, successful operations having been conducted with pressures ranging from about 5 pounds per square inch to about 20 pounds per square inch. The pressure however must be great enough to force the diaphragm 29 outwardly into the tire T as the beads of the latter are moved toward each other under the influence of the upper press platen 17. The upper limit of the pressure which may be used in the diaphragm is determined by that which will not excessively expand the tire T just before the mold sections are closed. Should the pressure inside the tire T be too great, the mold sections in closing would pinch the tread section of the tire therebetween. With pressures up to about 20 pounds per square inch on standard four-ply passenger car tires, the green carcass is not expanded to too great a degree. Actually, at that pressure there is a diametrical clearance 110 as shown in Fig. 10 between the tread section of the uncured tire T and the inner surface of the mold matrix at the time the mold sections are brought together. Then during the curing operation when a considerably higher pressure on the order of about 150 pounds per square inch is introduced into the diaphragm, the tire is forced radially outwardly into the tread portion of the mold sections and during the curing operation the softening of the rubber completely fills the mold cavity.

Figure 11:
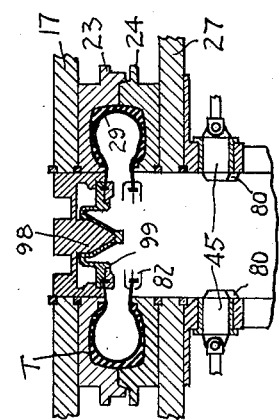

The curing operation is performed while the parts are in the position illustrated in Fig. 11 and the conditions of cure form no part of this invention since they are dictated by the tire manufacturer using the press. Curing conditions may vary from those wherein live steam at about 155 pounds per square inch is used to conditions wherein circulating hot water under pressure is used as the heating and expanding medium for the uncured tire.

The press will, of course, be provided with suitable control means not shown, whereby the press is locked in the closed position so long as there is any substantial amount of pressure inside the diaphragm. The press will likewise be provided with conventional timing mechanism which governs the time cycle operation of the press, and the duration and termination of the curing period. At the end of the curing period, the curing medium, whether it be steam or hot water, is exhausted from the inside of the diaphragm and a chilling medium, usually cold water, is used to flood the diaphragm for the purpose of cooling the tire and for the purpose of arresting the curing thereof. This is conventional practice and is employed in order to insure that the tire will be subjected to the proper curing temperature and for precisely the proper length of time.

Figure 12:
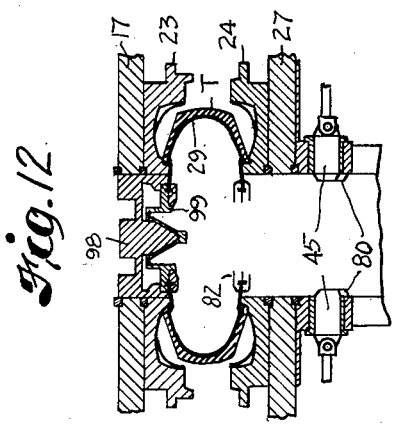

After the chilling medium is drained out of the diaphragm, the diaphragm is then again inflated and the press begins to open as shown in Fig. 12, the inflation of the diaphragm during this period being for the purpose of stripping the tire from the mold sections. Inflation of the diaphragm when the parts are in the position illustrated in Fig. 12 will cause said diaphragm to retain the beads of the cured tire T in engagement with the mold sections as the latter are separated. This spreading of the beads of the tire causes a reduction in the outside diameter of the tire, thus pulling the tire out of the mold matrix at its periphery. The amount of inflation may vary over a relatively wide range and in the operations which have been carried on thus far, pressures on the order of 20 pounds per square inch have been used successfully, although pressures considerably lower than 20 pounds per square inch have also been employed satisfactorily.

Figure 14:
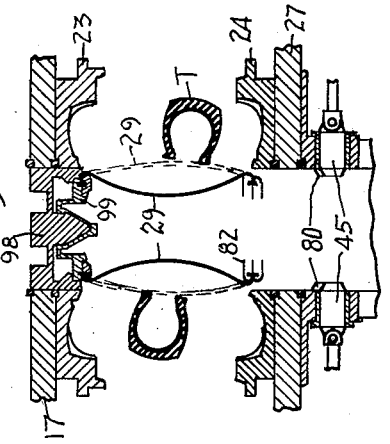
Figure 13:
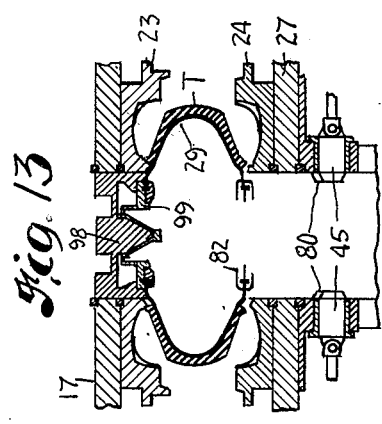

The pressure introduced into the diaphragm when the parts are in the position illustrated in Fig. 12 is continued until the parts have reached the position illustrated in Fig. 13, that is, when the beads of the tire have become separated from the respective mold sections. As soon as this occurs the pressure inside of the diaphragm is quickly reduced to atmospheric and then subatmospheric pressure so that when the upper mold section 23 moves upwardly carrying with it or permitting the upward movement of the upper head 93 of the diaphragm, the latter will be stripped inwardly out of the cured tire T until finally the tire is completely freed from the diaphragm, as illustrated in Fig. 14.

Simultaneously with the evacuation of the diaphragm as aforesaid, that is the reduction of the pressure therein to subatmospheric which occurs after the parts are in the position illustrated in Fig. 13, the latches 45 are withdrawn and the piston-like member such as 81 and head such as 82 thereon begin to slowly descend carrying the diaphragm with it downwardly and assisting in the withdrawal of the diaphragm from the tire. If desired, instead of having the member 81 begin its descent at the point just indicated, the downward travel thereof may be deferred until after the tire has been completely freed of the diaphragm, i. e. until after the parts have assumed the position illustrated in Fig. 14.

Figure 8:
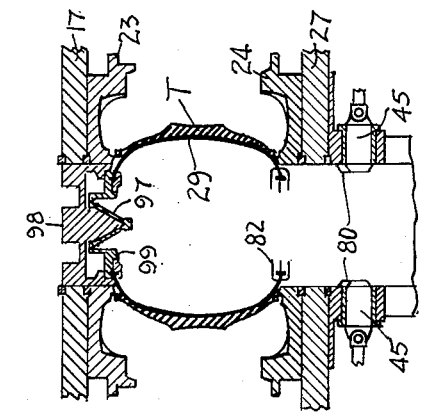
Figure 9:
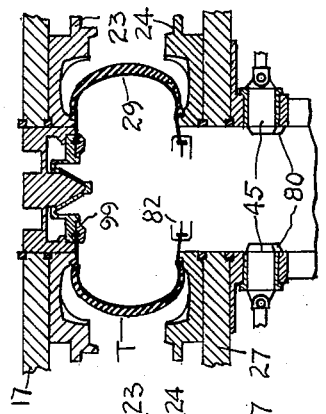
Figure 7:
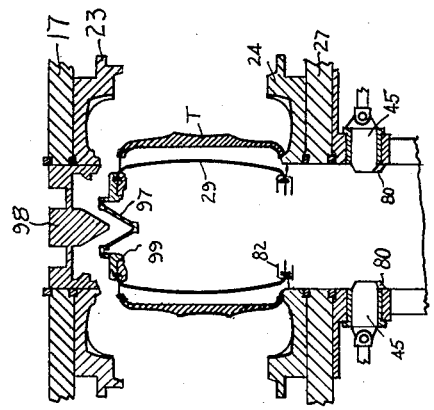

In connection with the previously given description of Fig. 8, it was pointed out that the member 81 and head 82 carrying the diaphragm is capable of traveling upwardly beyond the point normally occupied during the curing operation. This extra upward travel which is possible with the form of apparatus shown in Fig. 5, but not possible with the form of apparatus shown in Figs. 1-4, may be utilized to advantage and made to occur as for example while the parts move from the position illustrated in Fig. 12 to the position illustrated in Fig. 13. Such upward movement of the member 81 and diaphragm at this last-mentioned stage of the operation will have the effect of lifting the lower beads of the tire from the lower mold section and insuring that the tire will be stripped from the lower mold section 24. Of course, the upper mold section 23 may move upwardly for a considerable distance away from the lower mold section 24 so that there is never any difficulty in stripping the tire from the upper mold section 23.

A further advantage in having the press so constructed that the piston may move upwardly for a short distance from the position it normally occupies during the curing operation is to expose the lower edge of the diaphragm 29, thus making inspection, repair, and replacement of the diaphragm extremely simple.

It will be noted that in the sequence diagrams in Figs. 6–16 just described, the upper head 99 of the diaphragm assembly is provided with a conical portion 97 which is adapted to be engaged by a conical guide 98 carried by the upper movable platen 17 of the press. These two conical parts are thus made for the purpose of insuring that as the upper mold section descends on the tire T, the upper end of the diaphragm will be in proper axial alignment with the axis of the upper mold section.

With respect to the mechanism which locks and unlocks the upper platen 17 and mold section 23 for movement in unison with and independently of the upper head 99 of the diaphragm 29, the same is preferably operated as follows. After the curing operation has been completed but before the press begins to open, the actuator 105 is drawn upwardly by its associated rod 107 and piston 106 whereupon the spring 103 associated with each dog 101 then moves the latter inwardly into gripping engagement with the stud 100. Then when the upper platen 17 and mold section 23 ascends there will be positively carried with said parts, upper head 99 of the diaphragm assembly and thus augment the spring 94 in separating the diaphragm heads 82 and 99. The dogs 101 will remain in engagement with the stud 100 until the upper platen and mold section have traveled nearly to the upper limit of the upper head 99, whereupon a suitable limit switch (not shown) will energize the air cylinder in extension 18, forcing the piston 106, piston rod 107, and actuator 105 downwardly to cause projection of the actuator between said dogs 101, thus effecting outward swinging of the dogs and consequent disengagement thereof from said stud 100. This movement of the dogs frees the upper platen 17 and mold section 23 from the upper head 99 of the diaphragm 29 so that the diaphragm assembly may be retracted to the position illustrated in Figs. 15 and 16 whereafter the space between the mold sections 23 and 24 is unobstructed to permit ready removal of the cured tire T simply by lateral withdrawal from between the mold sections and to permit ready lateral insertion of a green tire band T between the mold sections preparatory to repeating the steps outlined above and as illustrated in Figs. 6–16, both such withdrawal and insertion of the tire T not requiring axial movement or tilting of the tire T as is required in existing presses which employ elastic diaphragms of the character indicated.

The modification illustrated in Figs. 17–19 is concerned with two principal functions which the previously described embodiments of the invention are not able to perform. The first of these is the application of a positive lifting force to the lower bead of the tire at the end of the cure to separate the tire from the lower mold half, and the second is the provision of means which will support the cured tire in spaced relation above the lower mold half at the end of the curing cycle and after the tire has been thus freed from the lower mold half so that the tire will not be blemished by resting on the hot lower mold. These ends are accomplished by the embodiment illustrated in Figs. 17–19 wherein the bead ring portion 112 of the lower mold 113 is made separable therefrom as an annular part. The annulus 112 is secured as by a bolt 114 to an annular ring 115 welded to a cylindrical sleeve 116, the form of which is most clearly illustrated in Fig. 19. At the juncture of the bead ring 112 and the weld 117 which joins the ring 115 and the sleeve 116, there is machined out a semicircular groove into which is snapped a split steel ring 118 of circular cross-section so that it will project slightly radially inwardly of the inner periphery of the bead ring 112.

The upper end of the piston-like member 119, which corresponds to the piston-like members 37 and 81 of the previously described forms of construction, is circumferentially relieved as at 120 to accommodate the bead ring 112 and at the lower end of the relief 120, the enlargement in diameter of the piston-like member provides a shoulder against which may rest the snap ring 118 and by which the bead ring 112 may be lifted as the piston member 119 is elevated slightly as, for example three inches from the latched position defining the position to be occupied by the diaphragm during the curing operation. The lower bead of the diaphragm (not shown) which corresponds to the diaphragm 29 of the previously described forms of construction, is secured between a ring 121 threadably secured to the upper end of the piston-like member 120 and an annular flange 122 on the lower head 123. In this respect it should be noted that the upper head of the diaphragm assembly and the diaphragm itself have been omitted in order to facilitate illustration of the novel features of the modification illustrated in this figure.

As previously indicated, the bead ring 112 is supported on a sleeve 116 which is telescoped with the upper end of the piston-like member 119, such sleeve being provided with a cut-out portion 124 at diametrically opposite points in order to permit such sleeve to pass around the latches 45 without interfering with the latter.

Mounted on a bracket 125 on the base of the machine is a single acting fluid actuated jack 126, the piston rod 127 of which is normally held retracted in the jack by means of the spring 128. As fluid under pressure is admitted to the jack through the conduit 129, the piston rod 127 carrying a serrated shoe 130 on the outer end thereof may be forced outwardly into engagement with the tire when the latter is in the position illustrated in full lines in Fig. 17.

It will be noted that Fig. 17 shows only one-half of the lower mold section and its associated parts. The parts illustrated in Fig. 17 will be duplicated on the other side of the press so that in actual construction there will be two jacks such as 126 respectively located at diametrically opposite points or, if desired, more than two may be employed at equally spaced points around the periphery of the lower mold section.

The operation of the apparatus illustrated in Figs. 17–19 is briefly as follows.

The operation of the press itself through the curing cycle is the same as that previously described and more specifically by having reference to Figs. 6–16 it will be the same as the sequence described in connection with those figures, through Fig. 12. After the parts have reached the position illustrated in Fig. 12, further opening movement of the press will be accompanied by an elevation of the lower piston-like member 119. Such elevation will, because of engagement between the piston-like member and the movable bead ring 112, mechanically force the tire off from the lower mold half of the press. The upward movement of the piston-like member 119 will therefore carry with it the cured tire until the latter reaches the position illustrated in full lines in Fig. 17. At the time the piston 119 reaches the limit of its upward travel, then by suitable limit switches (not shown) the jack 126 will be energized, forcing the piston rods 127 outwardly into engagement with the tire, and such jacks will remain energized until they are manually de-energized by the operator so that the tire will be held in its elevated position out of contact with the hot lower mold until the operator is ready to lift the tire out of the press.

Figure 15:
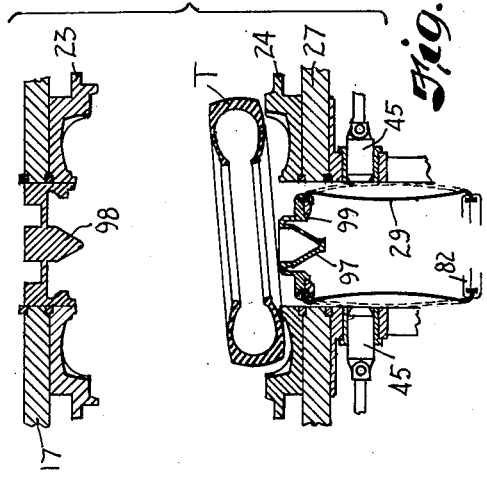

Immediately the jacks 126 are energized to engage the tire, then the piston-like member 119 will of course descend completing the cycle of operations shown in Figs. 14-16 whereby the diaphragm is withdrawn from the tire and the entire diaphragm assembly then withdrawn axially from the lower mold half, leaving the cured tire supported in space by means of the piston rods 127.

It will be observed that in each of the modifications constructed in accordance with my invention the expander diaphragm, during the fully open position of the press, is always under tension due to the initial compressive set in the spring which tends to force apart the heads which are secured to the opposite ends of the diaphragm. It has been found that the diaphragms have a tendency to stretch during use, so that the continued application of spring tension longitudinally of the diaphragm at all times when the press is open has a tendency to cause the diaphragm to grow in its axial dimension. In order to preclude such growth it is within the contemplation of my invention to provide means such as the cable 131 (see Fig. 17) which is, as illustrated in Fig. 17, attached at one end to the lower diaphragm head and at its other end is attached to the upper diaphragm head. Such cable or a chain which may be substituted therefor will be adjusted so that the length thereof between the upper and lower diaphragm heads will be such as to permit the spring such as 94 to fully expand the diaphragm but the cable will be of such length that if the spring has a tendency to stretch the diaphragm the cable will prevent too great a separating movement between the diaphragm heads under the influence of the spring.

Instead of using a single spring such as any of numbers 58, 60, or 94, a plurality of springs may be employed. Thus, for example, in the structure illustrated in Fig. 5 the inside diameter of the wheel in each head in which the opposite ends of the spring are seated may be increased sufficiently to accommodate a second cylindrical spring arranged coaxially with spring 94 illustrated.

In Fig. 17 the jacks 126 which have been illustrated as embodying one principle of my invention are shown to be provided with a piston rod which moves toward and away from the periphery of the tire on an axis which is in line with the travel of the piston in the jack. Instead of employing this arrangement I may use any scheme such as would be provided by a series of bell cranks or the like whereby a lever pivoted on a vertical axis parallel to the axis of the lower mold section would be rotated about such axis into and out of engagement with either the periphery of the tire or to just clear the upper face of the lower mold so as to prevent the tire from coming in contact with the mold in the interval following the end of the cure and before it is removed from the press.

Other modes of applying the principle of the invention may be employed, change being made as regards the details described, provided the features stated in any of the following claims, or the equivalent of such, be employed.

I therefore particularly point out and distinctly claim as my invention:

1. The method of forming flat built tires into tire form and then vulcanizing the same into finished condition which comprises, positioning the flat-built green tire carcass on the lower of an axially separated pair of complementary mold sections, moving into telescopic relation with the so-positioned green carcass a radially expansible substantially cylindrical diaphragm, expanding said diaphragm to shape the carcass to finished tire form and simultaneously moving said mold sections toward each other and into mating engagement, vulcanizing the thus shaped carcass while it is under the expanding influence of fluid pressure within said diaphragm, separating said mold sections axially while maintaining sufficient pressure within said diaphragm to hold the beads of the cured tire on their seats in the molds whereby axial separation of the beads results in a radial contraction of the tread portion of the cured tire and a separation of the same from the molds, and then reducing the pressure within said diaphragm while further separating said mold sections to fully free the tire from the molds.

2. The method of forming flat built tires into tire form and then vulcanizing the same into finished condition which comprises, positioning the flat-built green tire carcass on the lower of an axially separated pair of complementary mold sections, moving into telescopic relation with the so-positioned green carcass a radially expansible substantially cylindrical diaphragm, expanding said diaphragm to shape the carcass to finished tire form and simultaneously moving said mold sections toward each other and into mating engagement, vulcanizing the thus shaped carcass while it is under the expanding influence of fluid pressure within said diaphragm, separating said mold sections axially while maintaining sufficient pressure within said diaphragm to hold the beads of the cured tire on their seats in the molds whereby axial separation of the beads results in a radial contraction of the tread portion of the cured tire and a separation of the same from the molds, and then reducing the pressure within said diaphragm to subatmospheric while further separating said mold sections to fully free the tire from the molds and to withdraw the diaphragm radially inwardly from the cured tire.

3. The method of forming flat built tires into tire form and then vulcanizing the same into finished condition which comprises, positioning the flat built green tire carcass on the lower of an axially separated pair of complementary mold sections, moving into telescopic relation with the so-positioned green carcass a radially expansible substantially cylindrical diaphragm, expanding said diaphragm to shape the carcass to finished tire form and simultaneously moving said mold sections toward each other and into mating engagement, vulcanizing the thus shaped carcass while it is under the expanding influence of fluid pressure within said diaphragm, separating said mold sections axially while maintaining sufficient pressure within said diaphragm to hold the beads of the cured tire on their seats in the molds whereby axial separation of the beads results in a radial contraction of the tread portion of the cured tire and a separation of the same from the molds, then reducing the pressure within said diaphragm to subatmospheric while further separating said mold sections to fully free the tire from the molds and to withdraw the diaphragm radially inwardly from the cured tire, and then withdrawing said diaphragm axially from the cured tire leaving the cured tire resting freely on the lower mold section.

4. The method of forming flat built tires into tire form and then vulcanizing the same into finished condition which comprises, positioning the flat built green tire carcass on the lower of an axially separated pair of complementary mold sections with one bead edge of such carcass in substantial register with the bead molding portion of the mold on which such carcass is placed, moving into telescopic relation with the so-positioned green carcass a radially expansible substantially cylindrical diaphragm, radially expanding said diaphragm into engagement with said carcass, raising said diaphragm slightly to lift the carcass off from its supporting mold, expanding said diaphragm to shape the carcass to finished tire form and simultaneously moving said mold sections toward each other and into mating engagement, and then vulcanizing the thus shaped carcass while it is under the expanding influence of fluid pressure within said diaphragm.

5. The method of forming flat built tires into tire form and then vulcanizing the same into finished condition which comprises, positioning the flat built green tire carcass on the lower of an axially separated pair of complementary mold sections with one bead edge of such carcass in substantial register with the bead molding portion of the mold on which such carcass is placed, moving into telescopic relation with the so-positioned green carcass a radially expansible substantially cylindrical diaphragm having an axial extent substantially equal to the axial distance between the beads of the flat carcass, radially expanding said diaphragm into engagement with said carcass, raising said diaphragm slightly to lift the carcass off from its supporting mold, expanding said diaphragm to shape the carcass to finished tire form and simultaneously moving said mold sections toward each other and into mating engagement, vulcanizing the thus shaped carcass while it is under the expanding influence of fluid pressure within said diaphragm, separating said mold sections axially while maintaining sufficient pressure within said diaphragm to hold the beads of the cured tire on their seats in the molds whereby axial separation of the beads results in a radial contraction of the tread portion of the cured tire and a separation of the same from the molds, then reducing the pressure within said diaphragm to subatmospheric while further separating said mold sections to fully free the tire from the molds and to withdraw the diaphragm radially inwardly from the cured tire, and then withdrawing said diaphragm axially from the cured tire leaving the cured tire resting freely on the lower mold section.

6. Apparatus for forming flat built tires into tire form and then vulcanizing the same into finished condition comprising; a pair of complementary mold sections; means for relatively moving said mold sections to and from a mating closed position and a separated position; a tire forming device comprising; spaced heads, a flexible substantially cylindrical diaphragm secured at its opposite ends to said spaced heads respectively, means for varying the pressure within the space defined by said heads and diaphragm, means for moving said heads toward and away from each other; means supporting said forming device coaxially with said mold sections; means for relatively moving coaxially said forming device and said mold sections; and a separable bead ring in one of said mold sections arranged to be engaged by and moved off its seat by said forming device upon relative movement between the latter and said mold section.

7. Apparatus for forming flat built tires into tire form and then vulcanizing the same into finished condition comprising; a pair of complementary mold sections; means for relatively moving said mold sections to and from a mating closed position and a separated position; a tire forming device comprising; spaced heads, a flexible substantially cylindrical diaphragm secured at its opposite ends to said spaced heads respectively, means for varying the pressure within the space defined by said heads and diaphragm, means for moving said heads toward and away from each other; means supporting said forming device coaxially with said mold sections; means for relatively moving coaxially said forming device and said mold section; a separable bead ring in one of said mold sections arranged to be engaged by and moved off its seat by said forming device upon relative movement between the latter and said mold sections; and means mounted adjacent the lower of said mold sections and movable to a position over the face of said mold section to support a cured tire in the press out of contact with the molds thereof.

8. Apparatus for forming flat built tires into tire form and then vulcanizing the same into finished condition comprising; a pair of complementary mold sections; means for relatively moving said mold sections to and from a mating closed position and a separated position; a tire forming device comprising; spaced heads, a flexible substantially cylindrical diaphragm secured at its opposite ends to said spaced heads respectively, means for varying the pressure within the space defined by said heads and diaphragm, means for moving said heads toward and away from each other; means supporting said forming device coaxially with said mold sections; means for relatively moving coaxially said forming device and said mold sections to and from a position where said diaphragm is centrally within a tire band when the latter is elevated slightly above the lower of said mold sections and a position where said forming device lies rearwardly of the plane of the face of one of said mold sections; and a separable bead ring in one of said mold sections arranged to be engaged by and moved off its seat by said forming device upon relative movement between the latter and said mold section.

9. Apparatus for forming flat-built tires into tire form and then vulcanizing the same into finished condition comprising; a pair of complementary upper and lower mold sections; means associated with said lower mold section adapted to support on edge an uncured tire in pulley band form; means for relatively moving said mold sections to and from a mating closed position and an axially separated position; a radially expansible and contractible tire-forming device comprising a substantially cylindrical flexible diaphragm having closure heads at its opposite ends; means supporting said forming device coaxially with said mold sections and relatively moving one of said mold sections and said forming device while the latter is in its radially contracted position to and from a position where said forming device is positioned in its entirety in the space between said mold sections with the lower end of said forming device in the plane of the lower molding surface of the lower mold section and a position where said lower end of said forming device and its supporting means are both spaced from said plane.

10. Apparatus for forming flat-built tires into tire form and then vulcanizing the same into finished condition comprising; a pair of complementary upper and lower mold sections; means associated with said lower mold section adapted to support on edge an uncured tire in pulley band form; means for relatively moving said mold sections to and from a mating closed position and an axially separated position; a radially expansible and contractible tire-forming device; means supporting said forming device coaxially with said mold sections; and means for relatively moving said mold sections and said forming device while in its radially contracted position to and from a position where said forming device is positioned in its entirety in the space between said mold sections with the lower end of said forming device in the plane of the lower molding surface of the lower mold section and a position where the major portion of said forming device and its supporting means are both axially withdrawn from the space between said mold sections when the latter are in fully axially separated position.

11. The apparatus according to claim 9 further characterized in that in the last-mentioned position the upper end of said forming device is substantially in the plane of the lower molding surface of said lower mold section, and said forming device supporting means and the lower end of said forming device are below the plane of such lower molding surface.

12. The apparatus according to claim 9 further characterized in that said tire-forming device comprises a flexible, substantially cylindrical diaphragm, heads secured to the opposite ends of said diaphragm, and means for moving said heads axially apart to cause said forming device to assume said radially contracted position.

13. The apparatus according to claim 9 further characterized in that said tire-forming device comprises a flexible, substantially cylindrical diaphragm, heads secured to the opposite ends of said diaphragm, and means for resiliently urging said heads axially apart.

14. The apparatus according to claim 13 further characterized in that said forming device supporting means is secured to the lower one of said heads, and vertically reciprocates the forming device with respect to said lower mold section.

15. The apparatus according to claim 13 further characterized in that one of said heads and the adjacent mold section are provided with complementary engaging surfaces whereby, upon relative closing movement of said mold sections, said adjacent mold section engages said one head to move said heads relatively toward each other.

16. The apparatus according to claim 9 further characterized in that one of said mold sections is annular to receive in the central opening thereof said forming device supporting means and at least a major axial portion of said forming device when said forming device and its supporting means are in the last-mentioned position.

17. The apparatus according to claim 9 further characterized in that said lower mold section is annular to receive in the central opening thereof said forming device supporting means and at least a major axial portion of said forming device in the last-mentioned position of said forming device and its supporting means.

18. The apparatus according to claim 17 furfurther characterized in that said means for relatively moving said mold sections and said forming device vertically reciprocates the forming device whereby in the first-mentioned position said forming device projects upwardly from the plane of the lower molding surface of said lower mold section toward said upper mold section.

19. The apparatus according to claim 18 further characterized in that the upper end of said forming device and said upper mold section have complementary engaging surfaces operative upon relative closing movement of said mold sections to move the upper and lower ends of said forming device axially toward each other and thereby radially expand said forming device.

20. The apparatus according to claim 19 further characterized in that resilient means are provided in association with said forming device to resiliently urge such ends of said forming device axially apart.

PAUL A. FRANK.

REFERENCES CITED

The following references are of record in the file of this patent:

UNITED STATES PATENTS

| Number | Name | Date |
|---|---|---|
| 2,243,532 | Maynard | May 27, 1941 |
| 2,296,800 | Soderquist | Sept. 22, 1942 |
| 2,495,663 | Soderquist | Jan. 24, 1950 |
| 2,495,664 | Soderquist | Jan. 24, 1950 |